under all conditions of occurrence, which method by the addition of certain chemical compounds and the utilization of specific procedures eliminates the interference of other polymers or mixtures of polymers which may be present in a given test sample while producing a specific colored solution indicative of the presence of isobutylene.

More particularly, the invention provides a method for the qualitative identification of isobutylene under all conditions of occurrence comprising the steps of: dissolving a test sample in 2,2,4-trimethylpentane; simultaneously oxidizing said sample with an aqueous alkaline permanganate; an dreacting the test sample with nitric acid; said method yielding a specifically colored solution when the test sample contains isobutylene rubber.

United States Patent Office 3,502,435
Patented Mar. 24, 1970

3,502,435
METHOD FOR THE QUALITATIVE IDENTIFICATION OF ISOBUTYLENE RUBBER
Panagiotis L. Panagoulias, Highland Park, Mich., assignor to the United States of America as represented by the Secretary of the Army
No Drawing. Filed Mar. 2, 1967, Ser. No. 621,107
Int. Cl. G01n 33/44
U.S. Cl. 23—230
11 Claims

ABSTRACT OF THE DISCLOSURE

A method for the qualitative identification of isobutylene rubber comprising the steps of dissolving a test sample in 2,2,4-trimethylpentane; simultaneously oxidizing said sample with an aqueous alkaline permanganate; and reacting said test sample with nitric acid; said method yielding a color producing oxonium salt when said test sample contains isobutylene rubber.

---

The invention described herein may be manufactured and used by or for the Government for governmental purposes without the payment to me of any royalty thereon or therefor.

The present invention relates to a method for the qualitative identification of isobutylene rubber under all conditions of occurrence. More particularly, the invention relates to a non-pyrolytic, oxidation reaction suitable for the qualitative identification of isobutylene rubber under all conditions of occurrence.

The prior art methods for qualitatively identifying isobutylene as well as other elastomers were almost universally initiated by a pyrolysis of the elastomer sample to be tested. Subsequently, the vapors produced by the pyrolysis were passed through one or two reagent solutions which produced specific colors according to the elastomer compound present in the sample. Such methods were suitable and accurate so long as the composition of the test sample consisted of a single elastomer compound or, in the case of natural and polyisoprene rubber, two elastomer compounds. If other elastomers were present in the sample as compounds of, or mixtures with, isobutylene or another elastomer being tested for, the solutions would produce a color characteristic for each of the elastomers present and thus yield an unreadable result. The most that could be said in such cases was that the sample contained a mixture of elastomers, and it was all but impossible to determine what they were with prior art methods.

It is therefore an object of the present invention to provide a method for the qualitative identification of isobutylene which obviates the above difficulty.

Another object of the present invention is the provision of a method for the qualitative identification of isobutylene under all conditions of occurrence including occurrence as a compound or mixture with other elastomer compounds.

Still another object of the present invention is the provision of a method for the qualitative identification of isobutylene under all conditions of occurrence, which method eliminates the pyrolytic step of prior art methods.

The following description will make other objects and advantages of the present invention obvious to those skilled in the qualitative analytical arts.

According to the present invention, there is provided a method for the qualitative identification of isobutylene under all conditions of occurrence, which method by the addition of certain chemical compounds and the utilization of specific procedures eliminates the interference of other polymers or mixtures of polymers which may be present in a given test sample while producing a specific colored solution indicative of the presence of isobutylene.

More particularly, the invention provides a method for the qualitative identification of isobutylene under all conditions of occurrence comprising the steps of: dissolving a test sample in 2,2,4-trimethylpentane; simultaneously oxidizing said sample with an aqueous alkaline permanganate; an dreacting the test sample with nitric acid; said method yielding a specifically colored solution when the test sample contains isobutylene rubber.

A portion, about 3 grams, of a sample which is to be tested is cut into small pieces and extracted with acetone according to ASTM Procedure D–297 for an 8–10 hour period. The purpose of this extractiton is the removal of all traces of vulcanization and, as such, the step is primarily precautionary. It thus may be performed or eliminated according to the nature of the sample being tested.

The extracted sample is then air-dried and transferred to a container containing 30 ml. of an aqueous alkaline permanganate solution; in a preferred embodiment this solution consists of 100 ml. of water ($H_2O$), 8 grams of potassium permanganate ($K_2MnO_4$), and 4 grams of sodium hydroxide (NaOH), and 60 ml. of 2,2,4-trimethylpentane. This mixture is refluxed for about 2 hours at a temperature of 120° C. This refluxing step insures that the sample is properly dissolved in the 2,2,4-trimethylpentane to form a test sample solution and, further, it insures that the simultaneous oxidation of the sample, which forms an oxidized test sample, and is explained below, is carried substantially to completion.

The aqueous alkaline permanganate solution separates from the oxidized sample and 2,2,4-trimethylpentane solution and forms a clearly distinguishable underlying layer. The mixture is cooled and the permanganate solution separated from the 2,2,4-trimethylpentane solution with a separator funnel. A 5 ml. portion of the 2,2,4-trimethylpentane solution is then transferred to another test tube and one drop of nitric acid (sp. gr. 1.42) added. This mixture is shaken for a few seconds and then boiled for about one minute. The appearance of a permanent green color indicates the presence of isobutylene rubber.

The use of an aqueous alkaline permanganate solution provides milder reaction conditions than would occur in an acidic permanganate medium. Heating of the reaction mixture to 120° C. compensates for the milder reaction conditions and provides better control of the reaction. By operating under the above conditions exhaustive oxidation occurs, which oxidation fissures unsaturated compounds at their centers of unsaturation.

Thus the first butylene isomer $CH_3$—$CH_2$—$CH$=$CH_2$ when fissured at the center of unsaturation yields a three carbon acid and carbon dioxide as follows:

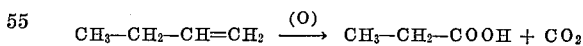

This result is indicative of a carbon chain having a terminal double bond.

The second structural isomer of butylene,
$$CH_3-CH=CH-CH_3$$
when oxidized as above, is characterized by the formulation of a two carbon acid as follows:

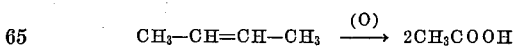

The isobutylene isomer,

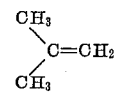

when oxidized as described above, yields a ketone and carbon dioxide as follows:

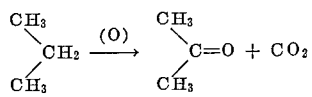

Such a ketone production is indicative of the presence of a branched chain structure having a terminal doubly-bonded methylene group.

The ketone which is produced by the oxidation of isobutylene, as described above, forms additional salt-like products when reacted with nitric acid. The salt formation occurs at the oxygen of the ketone through the formation of a tetravalent oxygen. Salts formed by such a tetravalent oxygen are called oxonium salts. It is difficult to explain the tetravalency of the oxygen, and it is usually considered that the oxonium salts are coordination compounds with a structure somewhat analogous to ammonium salts. The oxygen of the ketone being unsaturated, it is capable of adding acids or metal salts. Such addition compounds are the oxonium salts and their formation in the case of isobutylene is shown graphically as follows:

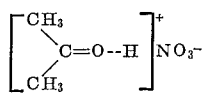

The

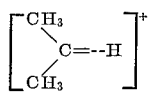

represents a complex oxonium ion which is ionically bonded to the nitrate radical. The dotted line represents a weak covalent bond which exists between the unsaturated oxygen of the ketone and the hydrogen atom supplied by the nitric acid. Such oxonium compounds are color producing and in the case of that represented above, the color produced is a permanent green.

Thus, the method, through the oxidation of the isobutylene with a mild permanganate solution and subsequent reaction with nitric acid, yields a specific colored solution. Through the exercise of proper procedures, the interference of other elastomers which may be present in the sample is eliminated.

What is claimed is:

1. A method for the qualitative identification of isobutylene rubber comprising the steps of:
    (a) oxidizing a test sample with an aqueous alkaline permanganate solution to form an oxidized test sample; and
    (b) reacting said oxidized test sample with nitric acid to form a color producing oxonium salt with the nitrate portion of said nitric acid.

2. A method in accordance with claim 1 wherein said aqueous alkaline permanganate solution consists of 100 ml. of water, 8 grams of potassium permanganate and 4 grams of sodium hydroxide.

3. A method in accordance with claim 1 wherein prior to reacting said oxidized test sample with said nitric acid, said aqueous alkaline permanganate and said test sample solution are separated by means of a separator funnel.

4. The method of claim 1 wherein said color producing oxonium salt is permanent green in color.

5. A method in accordance with claim 1 wherein said test sample is dissolved in 2,2,4-trimethylpentane prior to oxidation with said aqueous alkaline permanganate solution.

6. A method in accordance with claim 5 wherein said test sample is extracted with acetone for an 8–10 hour period prior to being dissolved in said 2,2,4-trimethylpentane.

7. A method in accordance with claim 5 wherein a mixture formed by said test sample, said 2,2,4-trimethylpentane and said aqueous alkaline permanganate solution is refluxed prior to reaction with said nitric acid.

8. A method in accordance with claim 7 wherein said refluxing is performed for a two hour period.

9. A method in accordance with claim 7 wherein prior to reacting said oxidized test sample with said nitric acid and subsequent to refluxing according to claim 7, said aqueous alkaline permanganate and said test sample solution are separated by means of a separator funnel.

10. A method in accordance with claim 7 wherein said refluxing is performed at a temperature of 120° C.

11. A method in accordance with claim 10 wherein said refluxing is performed for a two hour period.

References Cited

Burchfield, H.: Chem. Abstr., 40, 3292[2], 1946.
Mano, E. B.: Chem. Abstr. 57, 997f, 1962.
ASTM Standards on Rubber Products, 1957, pp. 132, 133.

MORRIS O. WOLK, Primary Examiner

R. M. REESE, Assistant Examiner